United States Patent
Yamazaki et al.

(10) Patent No.: US 6,183,866 B1
(45) Date of Patent: Feb. 6, 2001

(54) FINE PARTICLES FOR MODIFYING POLYOLEFINE

(75) Inventors: Kazuhiro Yamazaki, Niihama; Hiroyuki Tanimura, Sodegaura, both of (JP)

(73) Assignee: Sumitomo Chemical Company, Limited, Osaka (JP)

(*) Notice: Under 35 U.S.C. 154(b), the term of this patent shall be extended for 0 days.

(21) Appl. No.: 09/208,011

(22) Filed: Dec. 9, 1998

(30) Foreign Application Priority Data

Dec. 9, 1997 (JP) .................................................. 9-338654

(51) Int. Cl.[7] ........................................................ B32B 5/16
(52) U.S. Cl. ............................................. 428/403; 428/407
(58) Field of Search ..................................... 428/403, 407

(56) References Cited

U.S. PATENT DOCUMENTS

| | | | | |
|---|---|---|---|---|
| 4,017,452 | * | 4/1977 | Schwarz | 428/407 |
| 4,433,029 | * | 2/1984 | Senda et al. | 428/407 |
| 4,440,908 | * | 4/1984 | McClain | 525/196 |
| 4,465,755 | * | 8/1984 | Kiritani et al. | 430/111 |
| 4,517,246 | * | 5/1985 | Matsuyama et al. | 428/407 |
| 5,082,732 | * | 1/1992 | Ueda et al. | 428/402 |
| 5,139,875 | * | 8/1992 | Metzemacher et al. | 428/403 |
| 5,236,649 | * | 8/1993 | Hall et al. | 264/130 |
| 5,318,849 | * | 6/1994 | Mehalla et al. | 428/407 |
| 5,413,660 | * | 5/1995 | Harvey et al. | 156/243 |
| 5,489,648 | * | 2/1996 | Okimura et al. | 525/71 |
| 5,633,295 | * | 5/1997 | Higgs | 523/205 |
| 5,972,510 | * | 10/1999 | O'Hare et al. | 48/407 |

FOREIGN PATENT DOCUMENTS

| | | |
|---|---|---|
| 57-64522 | 4/1982 | (JP) . |
| 3-297646 | 12/1991 | (JP) . |
| 6-107868 | 4/1994 | (JP) . |
| 7-228729 | 8/1995 | (JP) . |

* cited by examiner

*Primary Examiner*—H. Thi Le
(74) *Attorney, Agent, or Firm*—Sughrue, Mion, Zinn, Macpeak & Seas, PLLC

(57) ABSTRACT

A fine particle for modifying polyolefine is provide. The fine particle comprises (i) a core layer having a refractive index which differs from that of the polyolefine by 0.05 or less and (ii) a shell layer having a solubility parameter which differs from that of the polyolefine by 3 $MPa^{1/2}$ or less, wherein the core layer is coated with the shell layer. The fine particle is excellent in affinity with polyolefine, and can modify polyolefine without accompanying damage on the transparency of the polyolefine.

11 Claims, No Drawings

FINE PARTICLES FOR MODIFYING POLYOLEFINE

BACKGROUND OF THE INVENTION

The present invention relates to a fine particle for modifying polyolefine. More particularly, it relates to a fine particle which is excellent in affinity with polyolefine, and modifies polyolefine without accompanying damage on the transparency of the polyolefine.

When polyolefine films are overlapped, they adhere to each other and result in a so-called blocking phenomenon, which causes many problems. To restrain the blocking phenomenon, there are known methods in which the properties of polyolefine are modified by adding fine particles to polyolefine. Particularly for polyolefine films, such methods are commonly conducted with inorganic fine particles such as silica particles or titanium oxide particles, or polymeric crosslinked particles such as polystyrene particles or polymethylmethacrylate particles added to polyolefine, to prevent the films from blocking.

For example, Japanese Patent Application Laid-Open No. 57-64522 (JP-A-57-64522) discloses an oriented polypropylene film obtained in the following manner. That is, polymeric fine particles having a particle size of 3 to 40 $\mu$m with a crosslinked structure and having no melting point are mixed with a polypropylene resin in a specific amount, the mixture is molten and extruded, followed by cooling, and then the resulting resin is stretched uniaxially or biaxially to obtain the oriented polypropylene film. The application also discloses that when the difference in solubility coefficient between the non-melting crosslinked polymer particles and the polypropylene resin is small, the affinity between the crosslinked polymer particles and the polypropylene resin is good, resulting in higher transparency of the oriented film. The fine particles of crosslinked polymers which are mainly made from polyethylene, polypropylene, polystyrene, polymethylmethacrylate, polycarbonate, polyethylene terephthalate or the like, are exemplified.

Japanese Patent Application Laid-Open No. 6-107868 (JP-A-6-107868) discloses a polyolefine film made of a composition obtained by mixing polyolefine with crosslinked particles which are made from a copolymer mainly composed of a (meth)acrylic monomer and a styrene monomer, and has an average particle size of 0.4 to 7 $\mu$m.

In addition, Japanese Patent Application Laid-Open No. 7-228729 (JP-A-7-228729) discloses a polyolefine film obtained by dispersing crosslinked particles having a core-shell form into a polyolefin polymer, wherein the crosslinked particles (core-shell particles) are prepared by polymerizing polymerizable monomers containing a crosslinkable monomer in an amount of 10% by weight or more to give crosslinked polymer particles (A), followed by coating the surface of the crosslinked particles (A) with a thermoplastic resin (B), and are composite crosslinked polymer particles having an average particle size of 0.01 to 10 $\mu$m.

As described above, many kinds of fine particles such as the inorganic particles or the crosslinked particles have been known and used for modifying polyolefine. However, these conventional fine particles can not keep the high transparency of polyolefine or can not show the high affinity with polyolefine, when the particles are mixed with polyolefine.

For example, fine particles such as silica particles or crosslinked polymethylmethacrylate particles have a refractive index close to that of polyolefine, and hence the transparency of polyolefine containing the particles is high. However, the affinity between polyolefine and the particles is insufficient and, therefore, the particles tend to separate from polyolefine when a polyolefine film containing the particles is process (ex. stretched or bent), causing problems such that voids are produced and the particles fall out of the polyolefine film.

The crosslinked polystyrene fine particles have high affinity with polyolefine, and hence the problems, such that voids are produced and the particles fall out of the polyolefine film, do not tend to occur. However, the refractive index of the crosslinked polystyrene fine particles does not be close to that of polyolefine and, therefore, the transparency of polyolefine containing the particles deteriorates.

When the copolymer fine particles mainly composed of a (meth)acrylic monomer and a styrene monomer are used for modifying polyolefine, both properties of the affinity and of the transparency are somewhat high. However, the transparency is not as high as that achieved by the crosslinked polymethylmethacrylate fine particles, and the affinity is not as high as that between the crosslinked polystyrene fine particles and polyolefine and, therefore, the generation of voids and the separation of particles and polyolefine are not restrained so much compared with the crosslinked polystyrene fine particles, either.

As described above, the composite crosslinked polymer particles having a core-shell form composed of core layer with a high crosslinking density and a shell layer with a low crosslinking density are used in the JP-A-7-22879, and in the examples thereof, the composite crosslinked polymer particles of which shell layer is mainly made from acrylic monomers are used. However, the affinity of these exemplified particles with polyolefine is insufficient and, therefore, the problems such as the generation of voids and the separation of particles and polyolefine have not been solved completely when the polyolefine to which these fine particles have been added is subjected to a stretching process.

SUMMARY OF THE INVENTION

The present invention provides a fine particle for modifying polyolefine which is excellent in affinity with polyolefine, and can modify polyolefine without accompanying damage on the transparency of the polyolefine.

That is, the present invention provides a fine particle for modifying polyolefine which comprises (i) a core layer having a refractive index which differs from that of the polyolefine by 0.05 or less and (ii) a shell layer having a solubility parameter which differs from that of the polyolefine by 3 MPa$^{1/2}$ or less, wherein the core layer is coated with the shell layer.

The present invention also provides a polyolefine film comprising a fine particles.

DETAILED DESCRIPTION OF THE PREFERRED EMBODIMENT

A fine particle of the present invention can be used for modifying polyolefine, a comprises a core layer and a shell layer existing on the surface on the core layer.

The core layer of the fine particle of the present invention has a refractive index which differs from that of polyolefine by 0.05 or less, preferably by 0.03 or less. The refractive index of the core layer may be substantially the same as that of polyolefine.

If the refractive index of the core layer differs from that of polyolefine by more than 0.05, the transparency of the polyolefine deteriorates undesirably when the fine particles composed of the core layer are mixed with polyolefine for modifying polyolefine.

Examples of materials for the core layer include inorganic materials such as silica and titanium oxide, and organic polymers such as acrylic resin, polystyrene, polyester, polyolefine and silicone resin.

The shell layer of the fine particle of the present invention, which exists on the surface of the above-described core layer, has a solubility parameter which differs from that of the polyolefine by 3 $MPa^{1/2}$ or less.

If the solubility parameter of the shell layer differs from that of polyolefine by more than 3 $MPa^{1/2}$, the affinity between polyolefine and the fine particles composed of the shell layer is low and, therefore, problems arise such that the voids are generated and the particles separate from polyolefine when a polyolefine film containing the particles is formed. In addition, the particles do not show a sufficient modifying effect such as anti-blocking effect when used for modifying polyolefine.

For forming an article of a polyolefine resin, for example, and uniaxially or biaxially film, a stretching roll is usually used. When the affinity between polyolefine and the particles mixed with polyolefine is low, the particles separate from the polyolefine and cause a contamination on the roll. The contamination itself on the roll is allowable if it is in small amounts. However, it results in contamination on the formed article and, therefore, it is preferable that there is not contamination on the roll. On the other hand, the void is a flaw of the formed article itself and it is desirable that the voids are reduced even in small quantities.

The solubility parameter of the present invention is defined by the three-dimensional parameter of ($\delta$ d, $\delta$ p, $\delta$ h) proposed by Hansen, C. M., and the difference ($\Delta\delta$) in solubility parameter between two substances is defined by the distance between two points in the three-dimensional coordinates as in the following Expression 1.

Expression 1

$$\Delta\delta^2 = (\delta\ d_1 - \delta\ d_2)^2 + (\delta\ p_1 - \delta\ p_2)^2 + (\delta\ h_1 - \delta\ h_2)^2$$

The value of the solubility parameter is peculiar to each substance, and is shown in, for example, "Handbook of Solubility Parameters and Other Cohesion parameters (2nd Ed.)" (CRC Press) and the like. There is also a method of calculating the value of the solubility parameter based on a group mole attraction constant.

For materials of the shell layer, inorganic materials and organic polymers can be used, but, organic polymers are preferably used. It is more preferable to use organic polymers mainly composed of styrene monomeric units or olefin monomeric units.

When organic polymers are used as the shell layer, it is preferred that the shell layer is crosslinked, or grafted onto the core layer. When the shell layer is crosslinked or grafted, the preferable fine particles can be obtained, since the shell layer of the fine particles hardly peels off from the core layer and hardly disperses into the polyolefine and, therefore, the affinity between the fine particles and polyolefine can be improved efficiently, when the fine particles are added to polyolefine, followed by melting and kneading.

When the thickness of the shell layer is "d" nm and the difference in refractive index between the shell layer and the polyolefine is "$\Delta n$", the fine particles for modifying polyolefine of the present invention preferably have the product value "$\Delta n \times d$" of 20 nm or less, and more preferably 10 nm or less.

When the thickness of the shell layer increases or the difference in refractive index between the shell layer and the polyolefine increases and, consequently, the value "$\Delta n \times d$" is more than 20 nm, then, the shell layer portion tends to largely scatter light, causing a reduction in transparency of polyolefine containing the resulting fine particles.

The thickness of the shell layer in the present invention can be calculated, from the previously measured average particle size of the core layer and the average particle size of the whole particles which are composed of the core layers and the shell layers (core-shell particles), or from the volume ration of the shell layer to the core layer and the average particle size of the core-shell particles. For example, in the case that the particles of the present invention are made from the resin obtained by two-stage polymerization of the core layer and the shell layer, the volume ration of the shell layer to the core layer can be easily obtained since almost all the utilized monomers become to be the corresponding polymers to form the core layer and the shell layer and, therefore, each volume of the shell layer and the core layer can be obtained, based on the amount of the utilized monomers. From such obtained volume ration and the average particle size of the core-shell particles, the thickness of the shell layer can be easily calculated.

The method for producing the fine particles of the present invention which have a core-shell form is not restricted. Examples thereof include known methods such as a method in which fine particles corresponding to the core layer itself are blended with fine particles to be the shell layer by a dry method or by a wet method to obtain composite particles; and a method in which two-stage polymerization of the core layer and the shell layer is conducted by the emulsion polymerization method or dispersion polymerization method.

Examples of the methods conducting the blending by the dry method or by the wet method to obtain the composite particles, include a coating method using a fluid bed (ex., "Chemical Engineering" p.p., 26–30, the March 1996, issue), a mechanofusion method using a shear type mill (ex., "Chemical Engineering" p.p., 34–42, the September 1995, issue), a hybridization method utilizing impact energy in high-speed flow (ex., "Journal of the Society of Powder Technology", vol. 33, the 8th issue, p.p., 35–43 (1996)), and a hetero coagulation method in which an amphoteric latex is blended (ex., "Kagaku Kogaku Ronbunshu" vol. 18, the 5th issue, p.p., 637–642, (1992)).

Examples of the method conducting the two-stage polymerization by the emulsion polymerization method and the dispersion polymerization method are also widely known (ex., J. of Polym. Sci. Polym. Chem. Ed. 16, 3219 (1980), etc.).

The latter methods in which the two-stage polymerization is conducted are suitable for obtaining the core-shell particles of which the shell layer is crosslinked or grafted onto the core layer.

The fine particles of the present invention are added to polyolefine and are used for modifying the polyolefine.

Examples of polyolefine include homopolymers or copolymers of $\alpha$-olefins such as propylene, ehtylene, 1-butene, 1-pentene, 1-hexene and 4-methyl-1-pentene; copolymers of the $\alpha$-olefins and monomers copolymerizable with the $\alpha$-olefins (ex., vinyl acetate and maleic acid); and the polymer mixtures thereof.

The fine particles of the present invention are used for modifying polyolefine in various amounts in accordance with their sue, and the amount is not restricted. The particles are usually used in an amount in the range of 0.01 to 50 parts by weight based on 100 parts by weight of polyolefine.

The method for adding the fine particles to polyolefine is not restricted as long as the fine particles are uniformly dispersed into polyolefine. Examples thereof include the methods in which the particles and polyolefine are mixed by a ribbon blender, Henschel mixer or the like, followed by melting and mixing the resulting mixture by an extruder.

When the fine particles are added to polyolefine, an agent such as antioxidant, neutralizer, lubricant, non-dropping agent or antistatic agent can also be appropriately added to polyolefine, if necessary.

The polyolefine to which the fine particles of the present invention have been added can be formed into film by known methods and is utilized for many applications. The polyolefine containing the fine particles is especially suitable for uniaxially or biaxially oriented films.

The present invention provides a fine particle for modifying polyolefine which is excellent in affinity with polyolefine, and can modify polyolefine without accompanying damage on the transparency of the polyolefine. Especially, when the polyolefine to which the fine particles have been added is subjected to a stretching process, there arise less problems such as the generation of voids and the separation of the particles and polyolefine, which enables the modifying effect to be exerted sufficiently.

The entire disclosure of the Japanese Patent Application No. 9-338654 filed on Dec. 9, 1997, indicating specification, claims and summary, is incorporated herein by reference in their entirety.

EXAMPLES

The present invention is described in more detail by following Examples, which should not be construed as a limitation upon the scope of the present invention.

In the following, Examples in which polypropylene was used as polyolefine and biaxially oriented films of polypropylene was formed are described, since the effect of affinity between the polyolefine and the fine particles emerges remarkably. The results of evaluation of Examples and Comparative Examples are shown in Table 2.

Forming a biaxially oriented film was carried out in the following manner. That is, a mixture of 100 parts by weight of polypropylene and 0.4 parts by weight of fine particles was subjected to melting and extrusion at a resin temperature of 260° C., which was then quenched by a 60° C. chill roll to be solidified by cooling in a film form having a thickness of 0.8 mm. Subsequently, after preheating, the film was subjected to five-fold stretching at a stretching temperature of 145° C. in the machine direction (MD) by a difference in peripheral speed between rolls of a stretching machine. Then, the film was subjected to eight-fold stretching at a stretching temperature of 157° C. in the transverse direction by means of a tenter, followed by a heat treatment at 165° C. to obtain an oriented film having a thickness of 20 μm. The one side of oriented film was then subjected to a corona treatment.

This film forming was continued for 2 hours. Then, the degree of contamination with the fine particles on the above MD stretching roll was measured with the eye.

An total haze value of each film and an internal haze value of each film were measured in accordance with ASTM D-103. The higher the transparency of the film, the smaller the haze value.

The solubility parameters of polypropylene and various kinds of polymers utilized in Examples and Comparative Examples for obtaining the fine particles were determined by using the Hansen parameters based on the mole traction constants thereof, and then a difference in solubility parameters between polypropylene and each polymer was calculated. The results are shown in Table 3.

To calculate a thickness of fine particles, firstly, the average particle size of the fine particles was measured and the volume ration of "core layer/shell layer" was calculated, which was based on the amounts of monomers used for forming the core layer and the shell layer. Then, the thickness of the shell layer of the fine particles was obtained by the average particle size and the volume ratio. The calculated results of the thickness are shown in Table 1.

Example 1

A closed vessel equipped with a stirrer was charged with 40 parts by weight of methanol, 4 parts by weight of styrene, 6 parts by weight of 2-ethylhexyl acrylate, 1 part by weight of 55% divinylbenzene, 0.05 part by weight of hydroxypropyl cellulose and 0.2 part by weight of t-butyl peroxy-2-ethyl hexanoate. After dissolution, the first-stage polymerization was effected at 90° C. for 10 hours to obtain fine particles having a refractive index of 1.51 and an average particle size of 1.3 μm. The fine particles were used as particles composing core layers in this example.

Into the mixture containing the fine particles, a mixed solution of 12 parts by weight of methanol, 3 parts by weight of styrene, 0.2 part by weight of 55% divinylbenzene and 0.06 part by weight of 2,2'-azobis(2,4-dimethylvaleronitrile) was added at 60° C. over 40 minutes, and then, the resulting mixture was further allowed to stand at 60° C. for 4 hours to complete the second-stage polymerization. As a result, fine core-shell particles having an average particle size of 1.4 μm were obtained.

The thickness of the shell layer of the obtained fine particles was calculated to be about 60 nm, which was based on the volume ratio of "core layer/shell layer".

The physical properties of the fine particles are shown in Table 1.

Into 100 parts by weight of polypropylene (refractive index; 1.51, melt index; 2.5 g/10 minutes), were mixed 0.4 part by weight of the obtained fine core-shell particles, 0.1 part by weight of calcium stearate as a stabilizer, 0.2 part by weight of 2,6-t-butyl hydroxytoluene, 0.05 part by weight of an antioxidant (Irganox 1010 manufactured by Ciba-Geigy) and 2 parts by weight of stearic ester of stearyl diethanolamine as an anti-static agent. Then, the resulting mixture was used to form a biaxially oriented film by the above-described method.

There was little or no contamination with the fine core-shell particles on the roll and a film having good transparency was obtained.

Example 2

The same procedure was carried out as in Example 1, except that, in the second-stage polymerization, the mixed solution to be used was changed into a mixed solution of 20 parts by weight of methanol, 5 parts by weight of styrene, 0.4 part by weight of 55% divinylbenzene and 0.1 part by weight of 2,2'-azobis(2,4-dimethylvaleronitrile), to obtain fine core-shell particles having an average particle size of 1.5 μm. The thickness of the shell layer of the fine particles was calculated to be about 100 nm.

A biaxially oriented film was formed in the same manner as in Example 1, except that the utilized particles were changed into the resulting particles of Example 2.

There was little or no contamination with the fine core-shell particles on the roll and a film having good transparency was obtained.

Example 3

The same procedure was carried out as in Example 1, except that, in the second-stage polymerization, the mixed solution to be used was changed into a mixed solution of 40 parts by weight of methanol, 10 parts by weight of styrene, 0.8 part by weight of 55% divinylbenzene and 0.2 part by weight of 2,2'-azobis(2,4-dimethylvaleronitrile), to obtain fine core-shell particles having an average particle size of 1.6 μm. The thickness of the shell layer of the fine particles was calculated to be about 170 nm.

A biaxially oriented film was formed in the same manner as in Example 1, except that the utilized particles were changed into the resulting particles of Example 3.

There was little or not contamination with the fine core-shell particles on the roll. The transparency of the obtained film slightly decreased compared with that of the films obtained in Example 1 and Example 2, but there was no particular problem in practical use for the film.

Comparative Example 1

The same first-stage polymerization as in Example 1 was conducted to obtain the fine particles. Without conducting a second-stage polymerization, the resulting fine polymers were utilized, instead of the core-shell particles, to form a biaxially oriented film in the same manner as in Example 1.

As a result, a film having good transparency was obtained. However, the contamination with the fine particles on the roll was severe and the agglomerates of fine particles falling off from the roll was left onto the film.

Comparative Example 2

A closed vessel equipped with a stirrer was charged with 40 parts by weight of methanol, 10 parts by weight of styrene, 1 part by weight of 55% divinylbenzene, 0.05 part by weight of hydroxypropyl cellulose and 0.2 part by weight of t-butylperoxy-2-ethyl hexanoate. After dissolution, polymerization was effected at 90° C. for 10 hours to obtain fine particles having a refractive index of 1.59 and an average particle size of 1.3 μm. The resulting particles were utilized, instead of the core-shell particles, to form a biaxially oriented film in the same manner as in Example 1.

There was little or no contamination with the fine particles on the roll, but transparency of the obtained film was low.

Comparative Example 3

Commercially available polymethylmethacrylate (PMMA) fine particles (MR2G manufactured by Sokenkagaku Co., having an average particle size of 2 μm and a refractive index of 1.49) were utilized, instead of the core-shell particles, to form a biaxially oriented film in the same manner as in Example 1.

The contamination with the fine particles on the roll was severe, and a large amount of voids were observed in the film.

Comparative Example 4

A closed vessel equipped with a stirrer was charged with 40 parts by weight of methanol, 7.5 parts by weight of styrene, 2.5 parts by weight of methyl methacrylate, 1 part by weight of 55% divinylbenzene, and 0.05 part by weight of hydroxypropyl cellulose and 0.2 part by weight of t-butylperoxy-2-ethyl hexanoate. After dissolution, polymerization was effected at 90° C. for 10 hours to obtain fine particles having a refractive index of 1.57 and an average particles size of 1.6 μm. The resulting particles were utilized, instead of the core-shell particles, to form a biaxially oriented film in the same manner as in Example 1.

There was little or no contamination with the fine particles on the roll, but voids were observed in the film.

TABLE 1

| | Physical properties of the added fine particles | | | | | | |
|---|---|---|---|---|---|---|---|
| | Core layer | | Shell layer | | | | Average |
| | Composition | Refraction Index | Composition | Δδ | Refraction Index | Thickness and Δn × d | particle size |
| Example 1 | Crosslinked copolymer of ST and 2EHA | 1.51 | Crosslinked polymer of ST | 2.1 | 1.59 | 60 nm and 4.8 nm | 1.4 μm |
| Example 2 | Crosslinked copolymer of ST and 2EHA | 1.51 | Crosslinked polymer of ST | 2.1 | 1.59 | 100 nm and 8.0 nm | 1.5 μm |
| Example 3 | Crosslinked copolymer of ST and 2EHA | 1.51 | Crosslinked polymer of ST | 2.1 | 1.59 | 170 nm and 14 nm | 1.6 μm |
| Comparative Example 1 | Crosslinked copolymer of ST and 2EHA | 1.51 | None (Δδ of the core layer = 3.9) | | | | 1.3 μm |
| Comparative Example 2 | Crosslinked polymer of ST | 1.59 | None (Δδ of the core layer = 2.1) | | | | 1.3 μm |
| Comparative Example 3 | Crosslinked polymer of MMA | 1.49 | None (Δδ of the core layer = 8.6) | | | | 2.0 μm |

TABLE 1-continued

| | Physical properties of the added fine particles | | | | | |
|---|---|---|---|---|---|---|
| | Core layer | | Shell layer | | | Average |
| | Composition | Refraction Index | Composition | Δδ | Refraction Index | Thickness and Δn × d | particle size |
| Comparative Example 4 | Crosslinked copolymer of ST and MMA | 1.57 | None (Δδ of the core layer = 2.8) | | | | 1.6 μm |

ST: Styrene
2EHA: 2-ethylhexyl acrylate
MMA: methyl methacrylate
Δδ: Difference in solubility parameter between the shell layer and polypropylene (unit: MPa$^{1/2}$)

TABLE 2

| | Film construction | | Evaluation result | | | |
|---|---|---|---|---|---|---|
| | Polypropylene Part by weight | Fine particle Part by weight | Roll contamination | Total | Haze % Internal | Voids |
| Example 1 | 100 | 0.4 | Δ | 3.3 | 0.9 | ○ |
| Example 2 | 100 | 0.4 | ○ | 3.3 | 0.9 | ○ |
| Example 3 | 100 | 0.4 | ○ | 4.7 | 2.2 | ○ |
| Comparative Example 1 | 100 | 0.4 | X | 3.3 | 0.7 | Δ |
| Comparative Example 2 | 100 | 0.4 | ○ | 5.8 | 2.8 | ○ |
| Comparative Example 3 | 100 | 0.,4 | XX | 2.2 | 1.0 | XX |
| Comparative Example 4 | 100 | 0.4 | ○ | 3.9 | 1.5 | ○ |

Evaluation of roll contamination and voids
○: Almost none
Δ: Observed a little bit
X: Observed
XX: Severely observed

TABLE 3

| | Hansen solubility parameter (MPa$^{1/2}$) | | | Difference in solubility parameter between the polymer and polypropylene (MPa$^{1/2}$) |
|---|---|---|---|---|
| | δd | δp | δh | Δδ |
| Polypropylene | 17.1 | 0 | 0 | 0 |
| Polymethyl methacrylate | 17.9 | 3.4 | 7.9 | 8.6 |
| Polystyrene | 19.2 | 0.6 | 0 | 2.1 |
| Poly-2-ethylhexyl acrylate, | 17.9 | 2.0 | 5.5 | 5.8 |
| Styrene/2-ethylhexyl acrylate copolymer (6/4), | 18.3 | 1.5 | 3.5 | 3.9 |
| Styrene/methyl methacrylate copolymer (3/1) | 18.9 | 1.3 | 1.7 | 2.8 |

What is claimed is:

1. A fine particle for modifying polyolefine which comprises (i) a core layer comprised of a crosslinked polymer and having a refractive index which differs from that of the polyolefine by 0.05 or less and (ii) a shell layer having a solubility parameter which differs from that of the polyolefine by 3 MPa$^{1/2}$ or less, wherein the core layer is coated with the shell layer.

2. A fine particle according to claim 1, wherein the product value (Δn×d) of the thickness (d) of the shell layer and the difference (Δn) in refractive index between the shell layer and the polyolefine is 20 nm or less.

3. A fine particle according to claim 1, wherein the shell layer comprises a polymer mainly composed of styrene monomeric units or olefin monomeric units.

4. A fine particle according to claim 1, wherein the polyolefine is polypropylene.

5. A fine particle according to claim 1, wherein the crosslinked polymer is a crosslinked copolymer of styrene.

6. A fine particle according to claim 1, wherein the shell layer is a crosslinked polymer of styrene.

7. A fine particle according to claim 1, wherein the shell layer is crosslinked or grafted onto the core layer.

8. A fine particle according to claim 7, wherein the crosslinked polymer in the core layer is a crosslinked copolymer of styrene.

9. A fine particle according to claim 7, wherein the shell layer is a crosslinked polymer of styrene.

10. A polyolefine film comprising fine particles which comprise (i) a core layer comprises of a crosslinked polymer and having a refractive index which differs from that of the polyolefine by 0.05 or less and (ii) a shell layer having a solubility parameter which differs from that of the polyolefine by 3 MPa$^{1/2}$ or less, wherein the core layer is coated with the shell layer.

11. A method for modifying polyolefine, which comprises a step of adding a fine particle to polyolefine, wherein the fine particle comprises (i) a core layer comprised of a cross-linked polymer and having a refractive index which differs from that of the polyolefine by 0.05 or less and (ii) a shell layer having a solubility parameter which differs from that of the polyolefine by 3 MPa$^{1/2}$ or less, and the core layer is coated with the shell layer.

* * * * *